US008171011B2

(12) United States Patent
Szulczewski

(10) Patent No.: US 8,171,011 B2
(45) Date of Patent: May 1, 2012

(54) CONTENT IDENTIFICATION EXPANSION

(75) Inventor: Piotr Szulczewski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1 day.

(21) Appl. No.: 12/686,625

(22) Filed: Jan. 13, 2010

(65) Prior Publication Data

US 2010/0114699 A1 May 6, 2010

Related U.S. Application Data

(63) Continuation of application No. 11/668,719, filed on Jan. 30, 2007, now Pat. No. 7,657,514.

(51) Int. Cl.
*G06F 17/30* (2006.01)

(52) U.S. Cl. .................................... 707/709; 705/14.54

(58) Field of Classification Search .......... 707/705–723, 707/770–776; 705/37, 14.41, 14.42, 14.51, 705/14.52, 14.53, 14.54, 14.55, 14.56, 14.71, 705/14.72, 14.73

See application file for complete search history.

(56) References Cited

U.S. PATENT DOCUMENTS

| | | | | |
|---|---|---|---|---|
| 5,724,521 | A | 3/1998 | Dedrick | 705/26.1 |
| 5,740,549 | A | 4/1998 | Reilly et al. | 705/14.42 |
| 5,848,397 | A | 12/1998 | Marsh et al. | 705/14.61 |
| 5,948,061 | A | 9/1999 | Merriman | 709/219 |
| 6,026,368 | A | 2/2000 | Brown et al. | 705/14.56 |
| 6,044,376 | A | 3/2000 | Kurtzman, II | 707/999.1 |
| 6,078,914 | A | 6/2000 | Redfern | 707/999.2 |
| 6,101,503 | A | 8/2000 | Cooper et al. | 707/999.003 |
| 6,144,944 | A | 11/2000 | Kurtzman, II et al. | 705/15.54 |
| 6,167,382 | A | 12/2000 | Sparks et al. | 705/14.73 |
| 6,269,361 | B1 | 7/2001 | Davis et al. | 707/999.2 |
| 6,401,075 | B1 | 6/2002 | Mason et al. | 705/14.72 |
| 6,985,882 | B1 | 1/2006 | Del Sesto | 705/37 |
| 7,039,599 | B2 | 5/2006 | Merriman | 705/14.52 |
| 7,136,875 | B2 | 11/2006 | Anderson et al. | 707/999.1 |
| 2005/0021397 | A1 * | 1/2005 | Cui et al. | 705/14 |
| 2005/0222989 | A1 | 10/2005 | Haveliwala et al. | 707/999.003 |
| 2006/0212350 | A1 | 9/2006 | Ellis et al. | 705/14.41 |
| 2007/0016473 | A1 | 1/2007 | Anderson et al. | 705/14.41 |
| 2008/0103887 | A1 | 5/2008 | Oldham et al. | 705/14.71 |
| 2008/0155588 | A1 | 6/2008 | Roberts et al. | 725/34 |

FOREIGN PATENT DOCUMENTS

| | | |
|---|---|---|
| KR | 20050000931 | 1/2005 |
| KR | 20060131746 | 12/2006 |
| WO | WO 97/21183 | 6/1997 |
| WO | 2006020576 | 2/2006 |

OTHER PUBLICATIONS

U.S. Appl. No. 95/001,073, filed Sep. 30, 2004, Reexamination of Stone et al.

U.S. Appl. No. 95/001,061, filed Sep. 3, 2002, Reexamination of Stone et al.

(Continued)

*Primary Examiner* — Wilson Lee
(74) *Attorney, Agent, or Firm* — Fish & Richardson P.C.

(57) ABSTRACT

Content of a first type, such as web pages, are identified in response to a query. One or more correlated entities are identified based on the content of the first type. Content of a second type, such as advertisements, are identified based on the one or more of the correlated entities.

18 Claims, 8 Drawing Sheets

OTHER PUBLICATIONS

U.S. Appl. No. 95/001,069, filed Jul. 11, 2002, Reexamination of Dean et al.
U.S. Appl. No. 95/001,068, filed Dec. 7, 2002, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of Control No. 7,240,025 B2, Control U.S. Appl. No. 95/001,073.
Request for Reexamination of Control No. 6,446,045 B1, Control U.S. Appl. No. 95/001,061.
Request for Reexamination of Control No. 7,249,059 B2, Control U.S. Appl. No. 95/001,069.
Request for Reexamination of Control No. 6,829,587 B2, Control U.S. Appl. No. 95/001,068.

* cited by examiner

CONTENT IDENTIFICATION EXPANSION

CROSS-REFERENCE TO RELATED APPLICATIONS

This application is a continuation application of and claims priority to U.S. application Ser. No. 11/668,719 filed on Jan. 30, 2007, the entire disclosure of which is incorporated herein by reference.

BACKGROUND

This disclosure relates to content identification.

Content of a first type, such as web pages, can be identified by one or more content servers in response to queries. The queries can, for example, include search engine queries. Additional contents of a second type, such as advertisements, can also be identified in response to the queries. For example, advertisements can be identified based on keywords in the queries.

Occasionally, however, content of the second type may not be identified in response to the query, or the identified content of the second type defines a small content set.

SUMMARY

In an implementation, content of a first type, e.g., web pages, responsive to a query is identified. One or more correlated entities based on the content of the first type are identified, and content of a second type, e.g., advertisements, based on one or more of the correlated entities is identified.

In another implementation, one or more keywords are selected and one or more queries based on the one or more keywords are generated. Content of a first type, e.g., web pages, responsive to the one or more queries is identified, and one or more correlated entities based on the content of the first type are identified. The one or more keywords are associated with the correlated entities.

DETAILED DESCRIPTION

Figure 1:
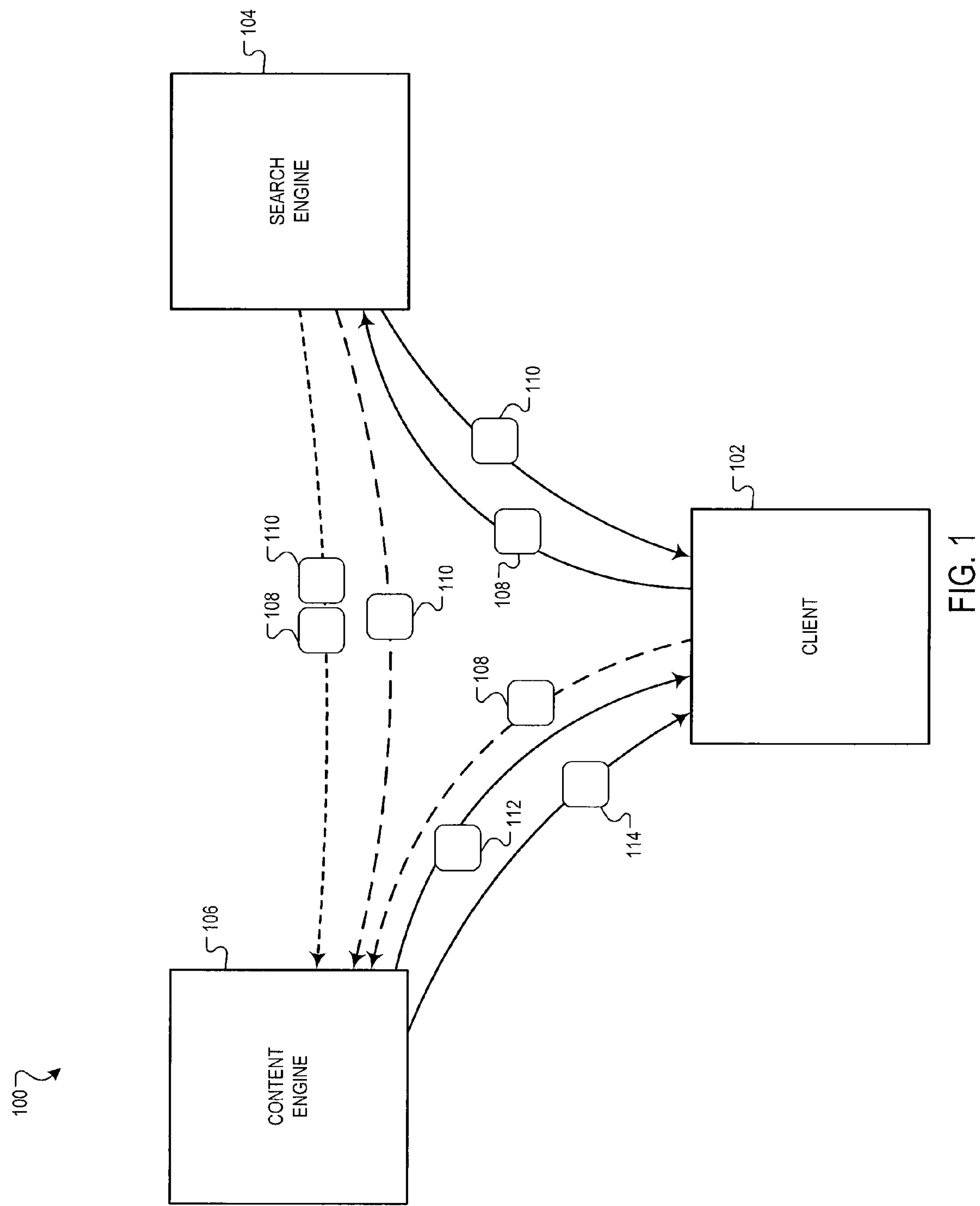
FIG. 1 is a block diagram of a content serving system.

FIG. 1 is a block diagram of a content serving system 100. The content serving system 100 can, for example, provide content to a requesting device, such as a client device 102. In one implementation, the system 100 includes a search engine 104 and a content engine 106. The client device 102, search engine 104, and content engine 106 can, for example, communicate over a network. The network can include one or more local area networks (LANs) or a wide area network (WAN), such as the Internet. In one implementation, the search engine 104 and the content engine 106 can, for example, be combined in a single serving entity, such as a server farm that includes one or more computer devices. Examples of such computer devices described with reference to FIG. 12 below. Other consolidation or distribution architectures can also be used.

The search engine 104 can, for example, generate content of a first type, e.g., web documents or links to web documents, in response to queries. The content engine 106 can, for example, generate additional content of a second type, e.g., advertisements, in response to the queries. For example, a query 108 can be submitted from the client device 102 to the search engine 104. The query 108 can, for example, include search terms or keywords. The search engine 104 can generate content of the first type 110 in response to the query 108. For example, the search engine 104 can identify web documents or links to web documents that include search terms. The content of the first type 110 can be provided to the client device 102.

In one implementation, the search engine 104 can provide the query 108 and the content of the first type 110 to the content engine 106, as illustrated by the single fine dashed line. In another implementation, the content engine 106 can separately receive the query 108 from the client device 102 and the content of the first type 110 from the search engine 104, as illustrated by the pair of coarse dashed lines.

The content engine 106 can, for example, generate content of the second type 112, such as advertisements, based on the query 108 and provide the content of the second type 112 to the client device 102. For example, the client device 102 can receive advertisements related to the query 108 from the content engine 106 and display the advertisements in a browsing application.

It is possible, however, that the content engine 106 may fail to identify content of the second type 112, e.g., advertisements, based on the query 108, or may only identify a small set of content of the second type 112, e.g., one or two advertisements, based on the query 108. To expand the identification of content of the second type, the content engine 106 can also generate additional content of the second type 114 based on the content of the first type 110. For example, the content engine 106 can generate advertisements based on web documents identified in response to the query 108. In an implementation, the content engine 106 can identify correlated entities in the content of the first type 110. For example, the content engine 106 can identify single- or multi-word expressions that frequently occur in web documents returned from the query 108. Based on one or more of the correlated entities, the content engine 106 can identify content of the second type 114, such as advertisements. Upon receipt of the content of the second type 114, the client device 102 can, for example, display the content of the second type 114.

In another implementation, the search engine 104 can, for example, identify the correlated entities in the content of the first type 110, and provide one or more of the correlated entities to the content engine 106. The content engine 106 can identify the content of the second type based on the one or more correlated entities.

The content of the second type 114 can include advertisements in the form of creatives including text, graphics and/or audio associated with the advertised service or product. The content of the second type 114 can also include other data, including image data, such as still images or video clips, and audio data, such as music or speech. The other data may also include a link to an advertisement "landing document" that contains further details about the advertised product or service, such as promotional materials, descriptions, coupons, etc. The link may be embedded in the advertisement or may be appended to the advertisement as a separate link.

Other content types can also be used. For example, the content of the first type can be audio and/or video files and/or streams that include metadata describing the audio and/or video content. Likewise, the content of the second type can, for example, be additional content such as text content, audio content, and/or video content. In one implementation, the content of the second type can include audio and/or video advertisements.

Figure 2:
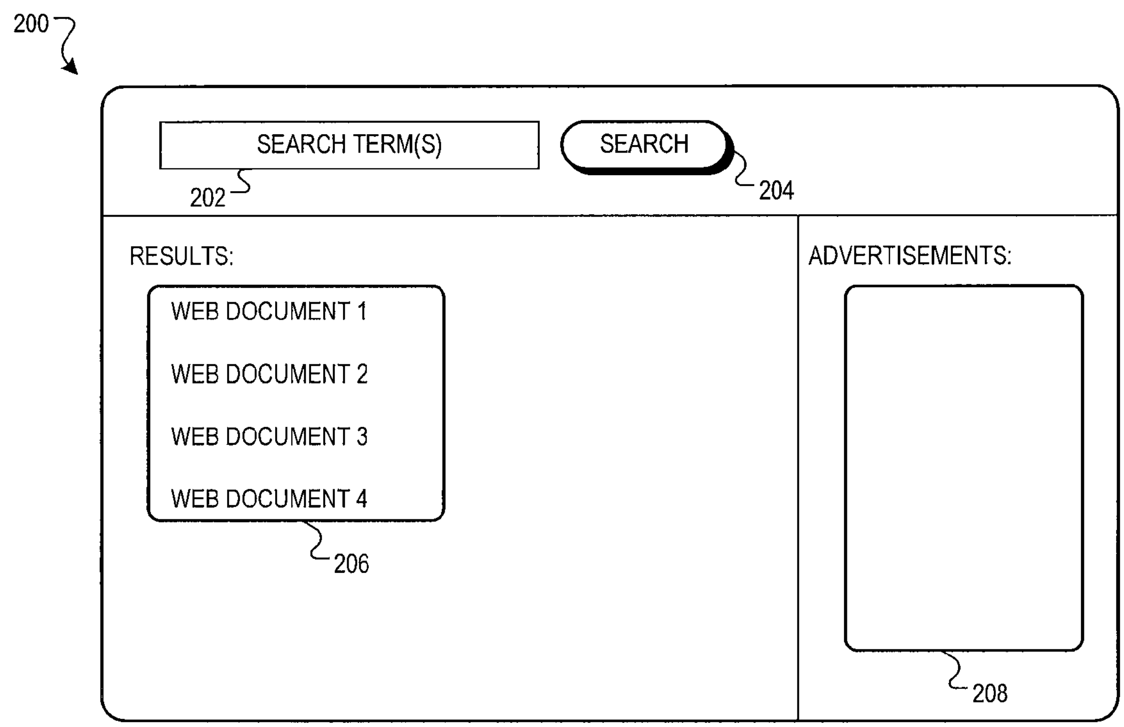
FIG. 2 is an example screen shot of an interface to a search engine displaying content of a first type.

FIG. 2 is an example screen shot of an interface 200 to a search engine, such as the search engine 104, displaying content of a first type, e.g. web documents, portions of web documents, or links to web documents. The interface 200 can, for example, be implemented in a web browsing application, in a widget, or in some other executable process on the client device 102. A user can, for example, type in search terms 202 into a text field and select a search button 204. The search terms 202 can be provided to the search engine 104, and the search engine 104 can generate a list of web documents 206 based on the search terms 202. The web documents 206 can, for example, be displayed in a frame of the search engine interface 200.

The content engine 106 can, for example, generate advertisements related to the search terms and display the advertisements in a frame 208 of the search engine interface 200. For some search terms 202, however, the content engine 106 may not be able to identify advertisements related to those search terms, and the frame 208 may be empty, as shown in FIG. 2.

Figure 3:
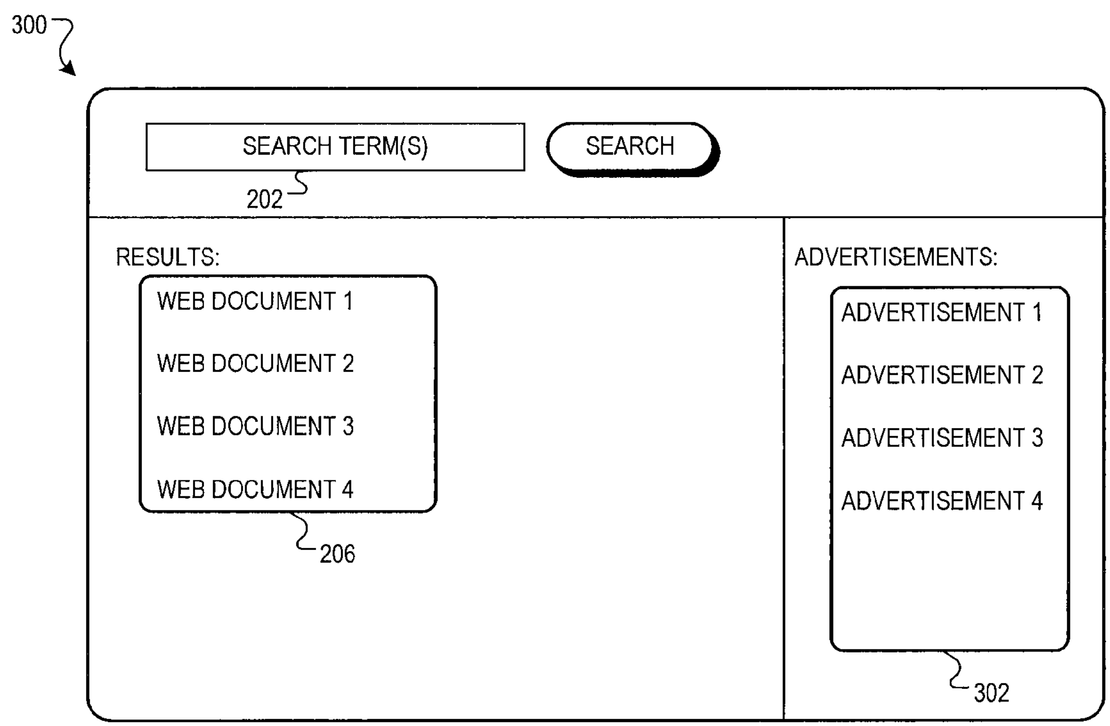
FIG. 3 is an example screen shot of an interface to a search engine displaying content of a first type and content of a second type.

FIG. 3 is an example screen shot of an interface 300 to a search engine displaying content of a first type and content of a second type, e.g., advertisements. The advertisements can, for example, be identified based on correlated entities. The content engine 106 can, for example, identify correlated entities in the web documents 206, and based one or more of these correlated entities, identify one or more advertisements 302. The advertisements 302 can be provided to the search engine interface 300 and displayed to the user.

Figure 4:
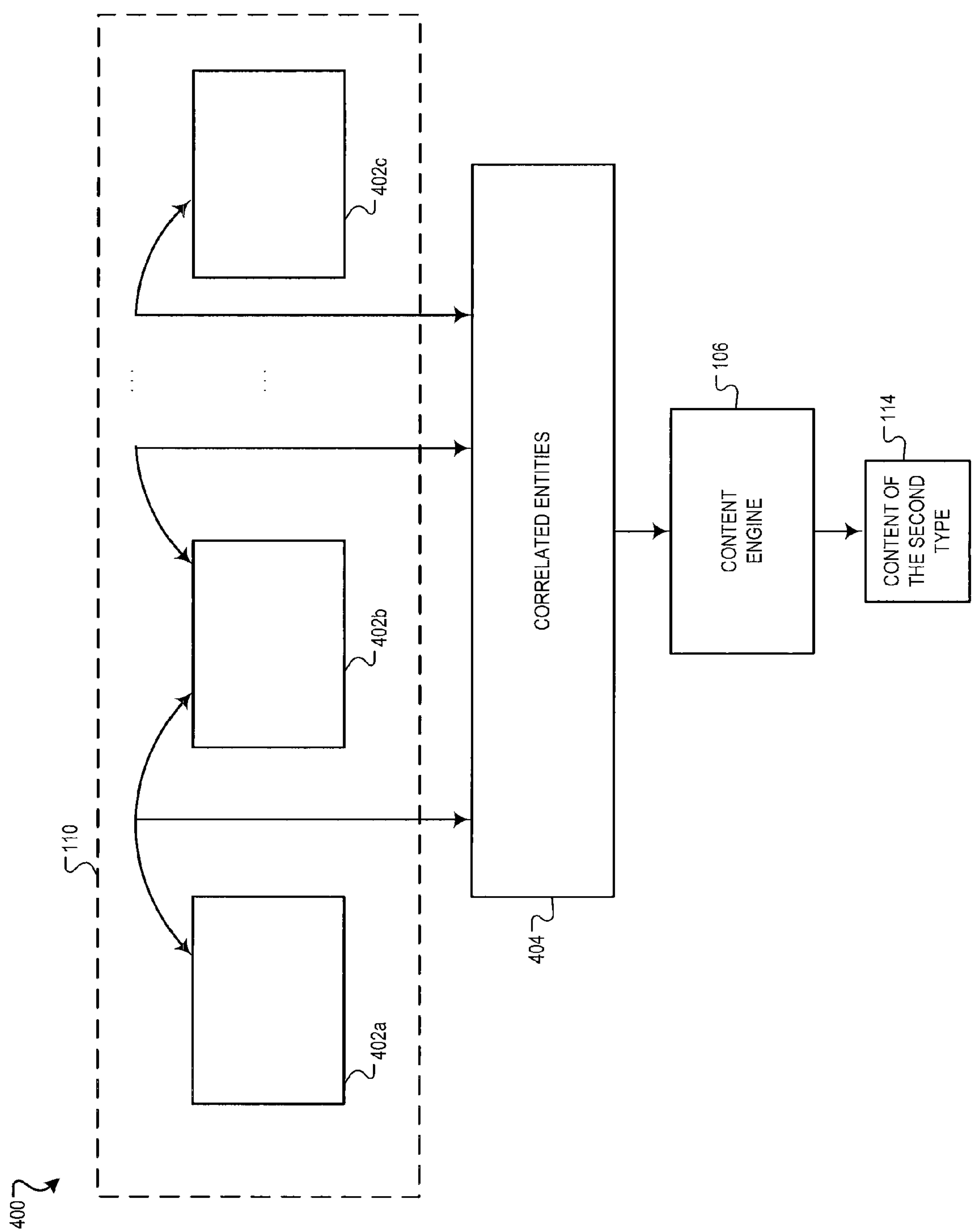
FIG. 4 is a block diagram illustrating identification of correlated entities.

FIG. 4 is a block diagram 400 illustrating identification of correlated entities. The content of the first type 110 can include several content elements such as content elements 404*a-c*. For example, the content of the first type 110 can define a set of web documents and content elements 404*a-c* can be individual web documents. In one implementation, the web documents 404*a-c* can, for example, be cached copies stored on one or more servers in communication with the search engine 104 and/or content engine 106. In another implementation, the web documents 404*a-c* can, for example, be retrieved from a publisher by the search engine 104 and/or content engine 106. Other content elements can also be used.

The search engine 104 and/or the content engine 106 can process the content elements 404*a-c* to identify one or more correlated entities 404. For example, a set of web documents can be searched to find multi-word expressions that occur in accordance with a frequency measurement in the set of web documents, or in a subset of the web documents. The content engine 106 can, for example, identify content of a second type 114, e.g., advertisements based on the one or more correlated entities 404.

For example, a query that includes one or more search terms can result in the identification of numerous web pages but few, if any, advertisements. By way of example only, if the query relates to soccer, such as the name of a soccer club, e.g., "Legia," the search engine 104 and/or the content engine 106 may identify multiple correlated entitles related to soccer, e.g., "soccer," "soccer club," "soccer equipment," "sports leagues," etc. Such correlated entities can, for example, be utilized by the content engine 106 to identify advertisements. In one implementation, one or more of the correlated entities are utilized as a query by the content engine 106. Other identification schemes can also be used.

In one implementation, the content engine 106 can determine if the content of the second type exceeds a threshold value, for example, five advertisements. If the content engine 106 determines that the content of the second type does not exceed the threshold, the content engine 106 can, for example, identify the multi-word expressions based on the content of web documents. Conversely, if the content engine 106 determines that the content of the second type does exceed the threshold, the content engine 106 can terminate the search process.

Figure 5:
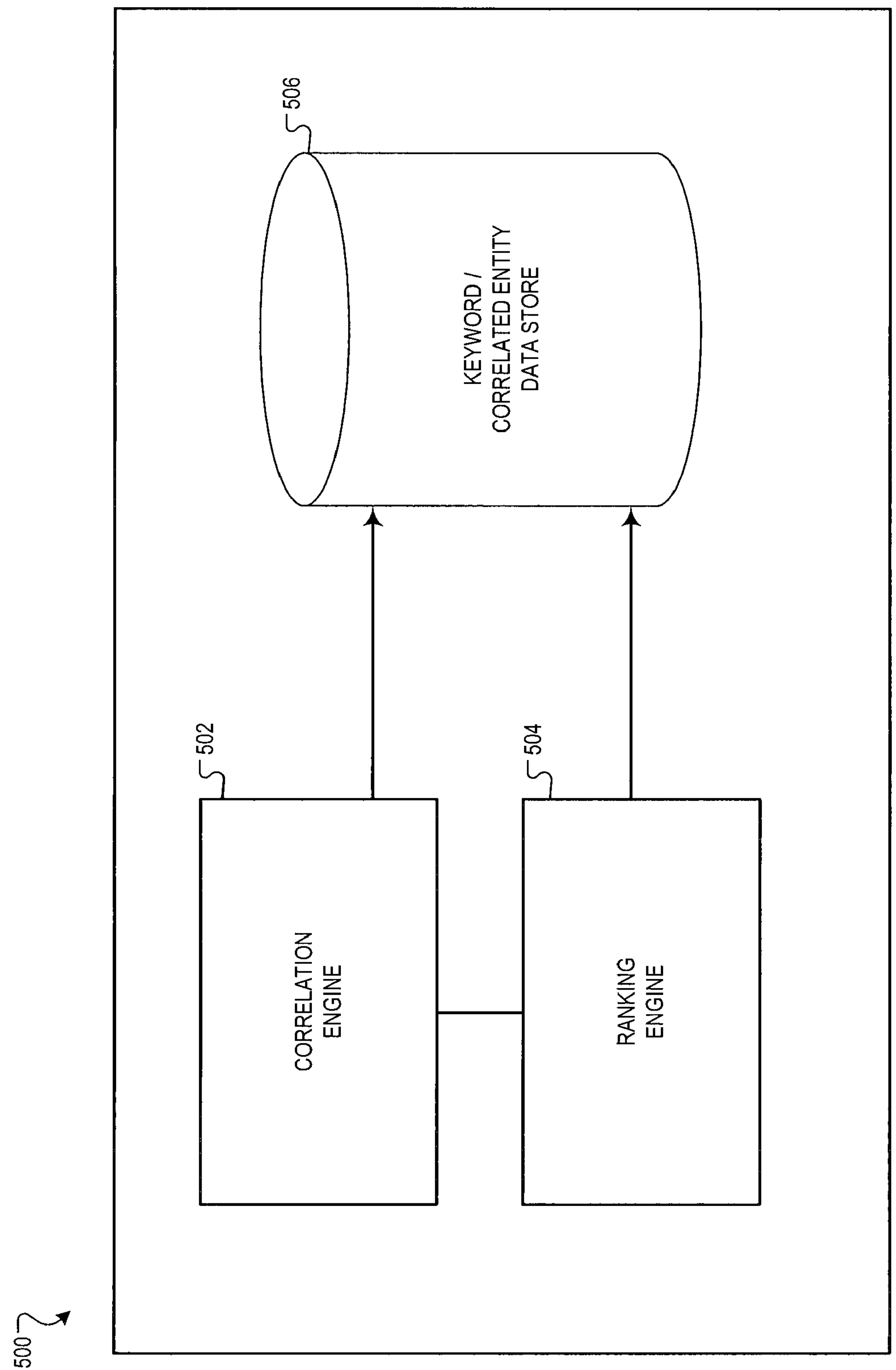
FIG. 5 is a block diagram of a content engine system.

FIG. 5 is a block diagram of a content engine system 500. The content engine system 500 can, for example, include a correlation engine 502, a ranking engine 504, and a keyword/correlated entity data store 506.

The correlation engine 504 can, for example, identify correlated entities 404 based on the content of the first type 110 by identifying entities, such as single- or multi-word expressions, that occur according to, for example, a frequency measure in the content of the first type 110. A correlated entity 404 can be identified based on a single document or based on multiple documents. For example, the correlation engine 504 can identify multi-word expressions whose frequency of occurrence in a set of web pages exceeds a threshold, e.g., a multi-word expression occurring more than a total of 50 times in one or more web documents. In one implementation, correlated entities 404 can be identified if the average frequency per web document exceeds a threshold, e.g., if a multi-word expressions appears, on average, more than 5 times per web document in a set of web documents. Other processes and algorithms to identify correlated entities can also be used. Identified correlated entities 404 can, for example, be stored in the keyword/correlated entity store 506.

The ranking engine 504 can, for example, rank correlated entities 404 according to one or more metrics. For example, correlated entities 404 can be ranked based on a frequency of occurrence in the content of the first type 110, such as a frequency of occurrence of single- or multi-word expressions in one or more web documents. In another implementation, correlated entities 404 can be ranked based on locations of the correlated entities 404 in the content of the first type 110. For example, correlated entities 404 that are prominently displayed, such as in titles, headings, displayed in a larger font, etc., can be ranked higher than correlated entities 404 identified in ordinary paragraph text.

In another implementation, correlated entities 404 can be ranked based on a relevance measure between each content of the first type 110 and the query 108. The search engine 104 can, for example, determine a relevance measure that indicates a degree of relevance between a web document and the query 108. For example, the content of the first type, e.g., web documents, may be presented by the search engine 104 based on the relevance measure. Correlated entities 404 that are found in web documents having a higher relevance measure can be ranked higher than correlated entities 404 found in web documents having a lower relevance measure. The ranking metrics can, for example, be stored in the keyword/correlated entity store 506.

In one implementation, correlated entities 404 that are associated with keywords can, for example, but utilized concurrently with the keyword to identify the content of the second type. The preprocessing of the correlated entities 404 can, for example, facilitate a more responsive search for content of the second type.

In another implementation, correlated entities 404 that are associated with keywords generated from a particular web page can, for example, be offered to a publishers of web pages associated with the keywords. The offer can, for example, be implemented through an auction, or by some other offer process.

Figure 6:
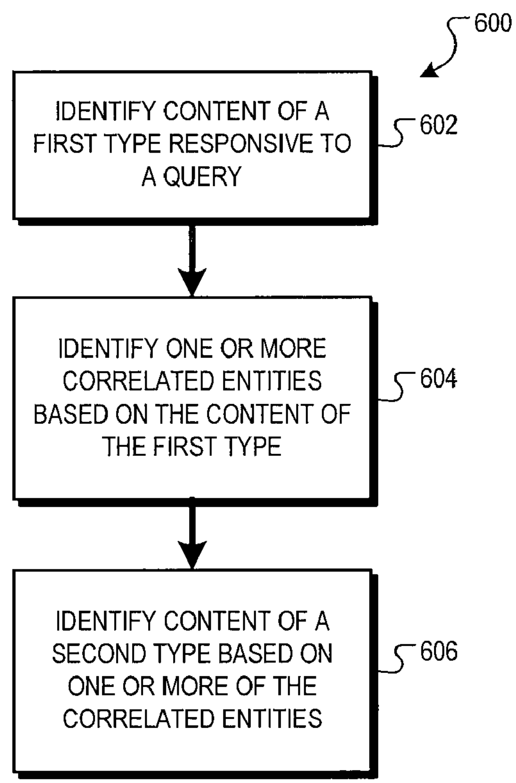
FIG. 6 is a flow diagram of an example process for identifying content based on correlated entities.

FIG. 6 is a flow diagram of an example process 600 for identifying content based on correlated entities. The process 600 can, for example, be implemented in a system such as the system 100 of FIG. 1 implementing the system 500 of FIG. 5.

Stage 602 identifies content of a first type responsive to a query. For example, the search engine 104 can identify the content of the first type 110, e.g., web documents, in response to the query 108.

Stage 604 identifies one or more correlated entities based on the content of the first type. For example, the content engine 106 can identify correlated entities, e.g., multi-word expressions, based on the content of the first type 110.

Stage 606 identifies content of a second type based on one or more of the correlated entities. For example, the content engine 106 can identify advertisements based on one or more multi-word expressions.

Figure 7:
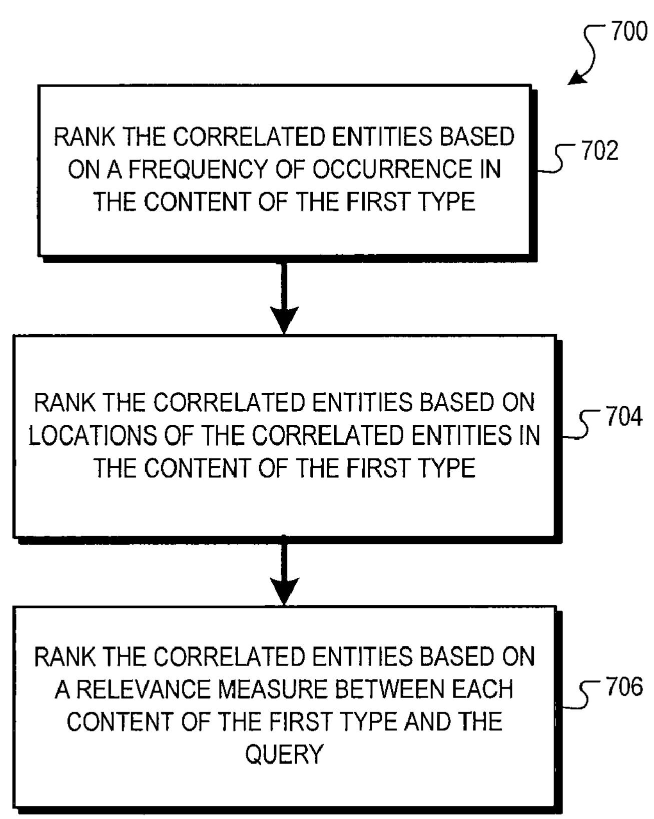
FIG. 7 is a flow diagram of an example process for ranking correlated entities.

FIG. 7 is a flow diagram of an example process 700 for ranking correlated entities. The process 700 can, for example, be implemented in a system such as the system 100 of FIG. 1 implementing the system 500 of FIG. 5.

Stage 702 ranks the correlated entities based on a frequency of occurrence in the content of the first type. For example, the content engine 106 can rank multi-word expressions based on a frequency of occurrence in web documents.

Stage 704 ranks the correlated entities based on locations of the correlated entities in the content of the first type. For example, correlated entities that are found in prominent locations such as titles and headings or are displayed in a larger font can be ranked higher than correlated entities found in ordinary paragraph text.

Stage 706 ranks the correlated entities based on a relevance measure between each content of the first type and the query. For example, correlated entities can be ranked by a relevance measure provided by the search engine 104, where the relevance measure indicates how relevant a web document is to the query 108.

Figure 8:
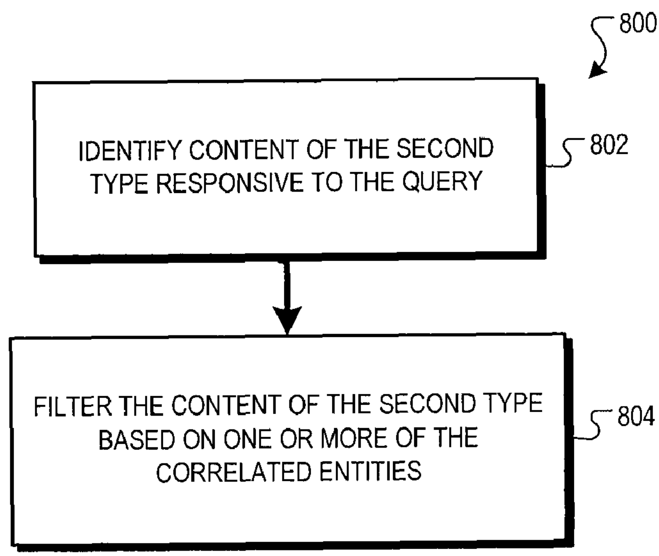
FIG. 8 is a flow diagram of an example process for filtering content based on correlated entities.

FIG. 8 is a flow diagram of an example process 800 for filtering content based on correlated entities. The process 800 can, for example, be implemented in a system such as the system 100 of FIG. 1 implementing the system 500 of FIG. 5.

Stage 802 identifies content of the second type responsive to the query. For example, the content engine 106 can identify advertisements that are related to the query 108.

Stage 804 filters the content of the second type based on one or more of the correlated entities. For example, advertisements that are related to both the query 108 and the correlated entities 404 can be displayed first.

Figure 9:
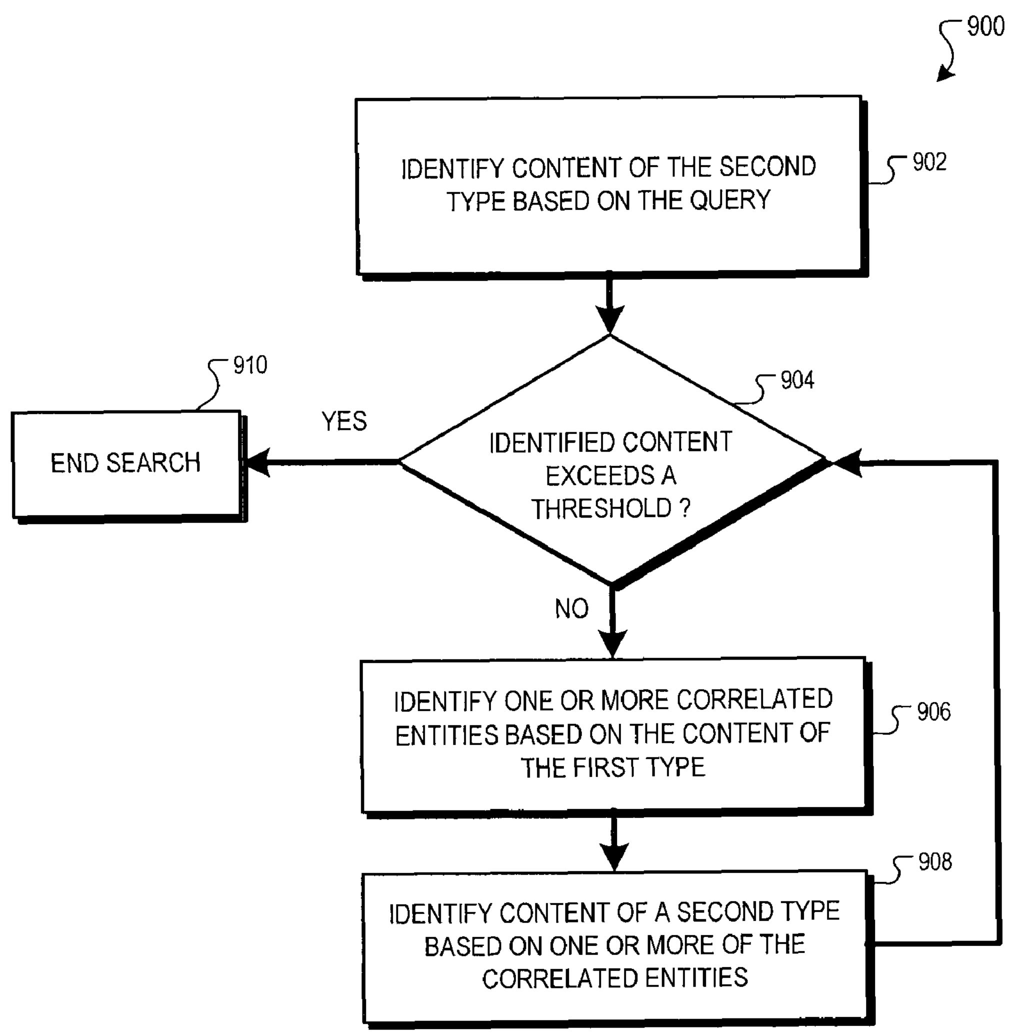
FIG. 9 is a flow diagram of an example process for selectively identifying content.

FIG. 9 is a flow diagram of an example process 900 for selectively identifying content. For example, advertisements can be identified based on correlated entities if the number of advertisements identified based on the query 108 is less than a threshold. The process 900 can, for example, be implemented in a system such as the system 100 of FIG. 1 implementing the system 500 of FIG. 5.

Stage 902 identifies content of the second type based on the query. For example, the content engine 106 can identify advertisements that are related to the query 108.

Stage 904 determines if the identified content exceeds a threshold. For example, the content engine 106 can determine if the number of advertisements related to the query 108 exceeds a threshold value, for example 5 advertisements.

If stage 904 determines that the identified content does not exceed a threshold, then stage 906 identifies one or more correlated entities based on the content of the first type. For example, the content engine 106 can identify multi-word expressions based on the content of web documents.

Stage 908 identifies content of a second type based on one or more of the correlated entities. For example, the content engine 106 can identify advertisements based on one or more multi-word expressions. The advertisements based on the correlated entities can be displayed together with the advertisements that may have been identified based on the query 108.

After the execution of stage 908, the process 900 proceeds to stage 904. If stage 904 determines that the identified content exceeds the threshold, the process 900 proceeds to stage 910, at which time the query processing ends. Otherwise, the stages 906 and 908 can be executed again.

Figure 10:
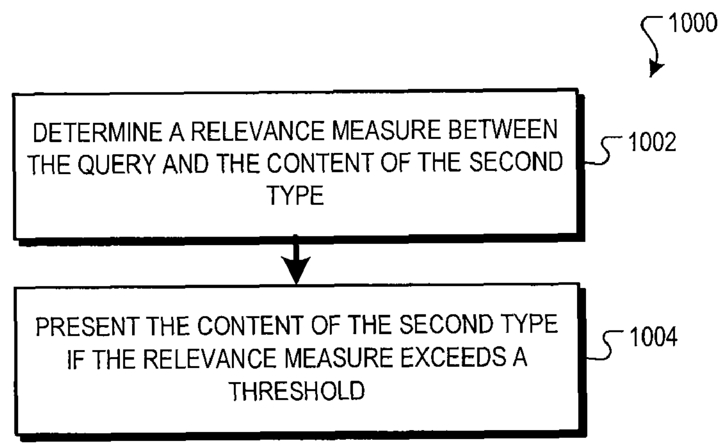
FIG. 10 is a flow diagram of an example process for determining a relevance measure.

FIG. 10 is a flow diagram of an example process 1000 for determining a relevance measure. The process 1000 can, for example, be implemented in a system such as the system 100 of FIG. 1 implementing the system 500 of FIG. 5.

Stage 1002 determines a relevance measure between the query and the content of the second type. For example, the content engine 106 can determine a relevance measure between the query 108 and advertisements that have been identified based on correlated entities found in web documents.

Stage 1004 presents the content of the second type if the relevance measure exceeds a threshold. For example, the content engine 106 can present advertisements that have a relevance measure of 50% or higher with the query 108.

Figure 11:
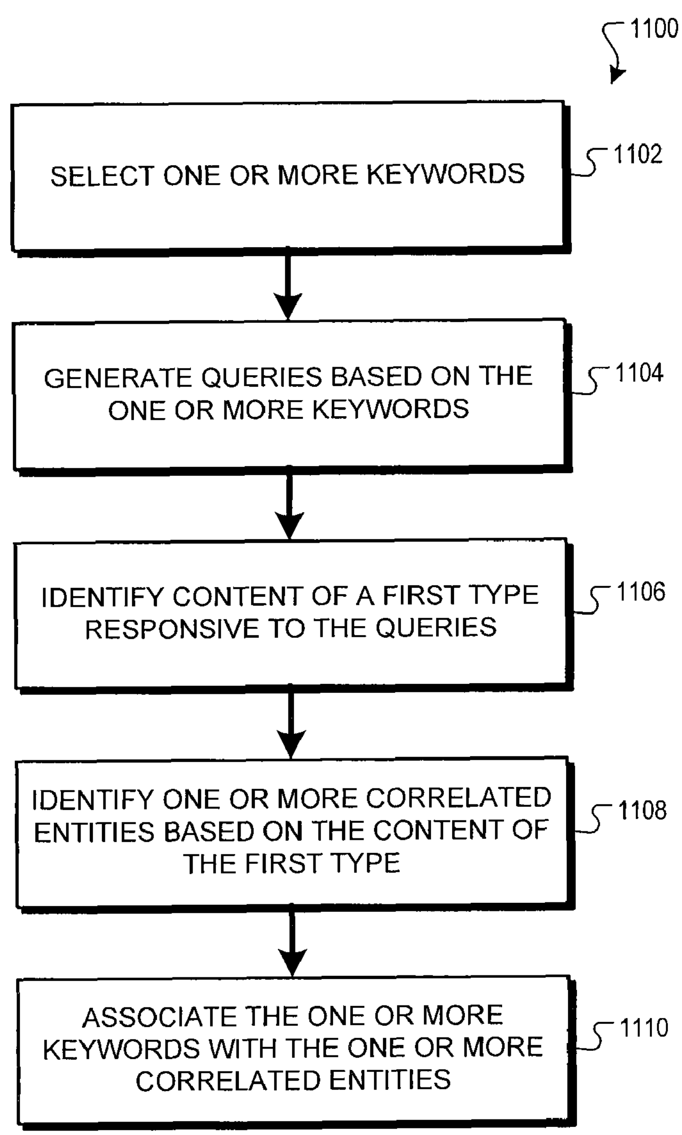
FIG. 11 is a flow diagram of an example process for associating keywords with correlated entities.

FIG. 11 is a flow diagram of an example process 1100 for associating keywords with correlated entities. The process 1100 can, for example, be implemented in a system such as the system 100 of FIG. 1 implementing the system 500 of FIG. 5.

Stage 1102 selects one or more keywords. For example, keywords associated with a particular web document can be selected. In one implementation, the keywords can be selected automatically, e.g., a web page can be submitted to search engine 104, and the search engine 104 can process the web page to identify relevant keywords.

Stage 1104 generates queries based on the one or more keywords. For example, queries based on the keywords can be submitted as search queries to the search engine 104.

Stage 1106 identifies content of a first type responsive to the one or more queries. For example, the search engine 104 can identify one or more web pages responsive to the query.

Stage 1108 identifies one or more correlated entities based on the content of the first type. For example, the content engine 106 can identify multi-word expressions based on web documents returned from the query 108; or can identify keywords associated with the web documents returned from the query 108; or can identify correlated entities according to other identification schemes.

Stage 1110 associates one or more keywords with the correlated entities. For example, multi-word expressions that have been identified can be added to a list of search keywords associated with a particular web document.

The one or more correlated entities, upon such association, can, for example, be utilized by the content engine 106 to identify content of the second type when an associated keyword is submitted to the search engine 104.

Figure 12:
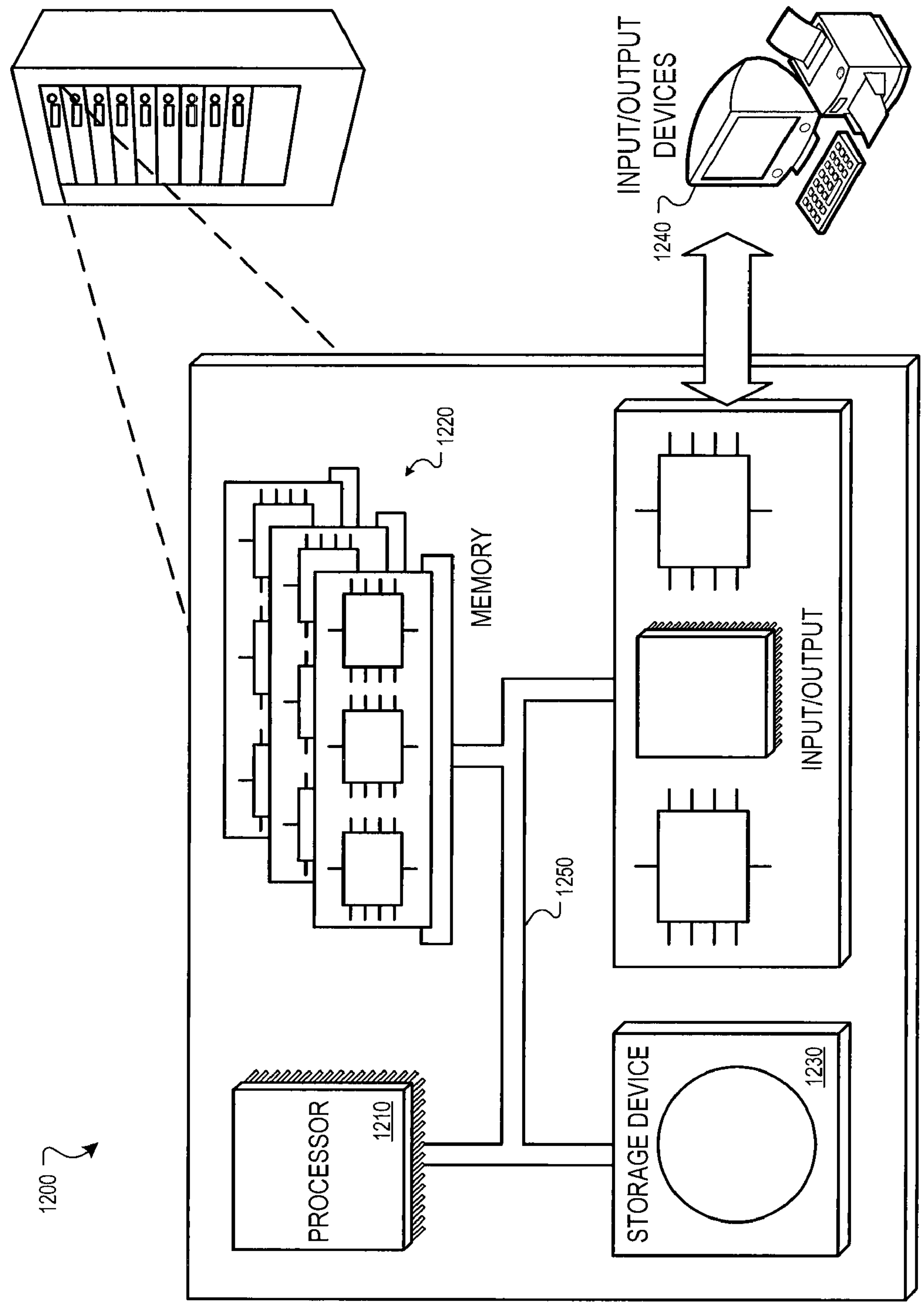
FIG. 12 is a schematic diagram of an example computer system.

FIG. 12 is a schematic diagram of an example computer system 1200. The system 1200 can be used for the operations described in association with the methods 600, 700, 800, 900, 1000, and 1100, according to one implementation. For example, one or more of the systems 1200 can be utilized to implement a server hosting the content engine 106 and/or the search engine 104.

The system 1200 includes a processor 1210, a memory 1220, a storage device 1230, and an input/output device 1240. Each of the components 1210, 1220, 1230, and 1240 can, for example, be interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 can, for example, include a hard disk device, an optical disk device, or some other large capacity storage device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method performed by a computer system, comprising:
- selecting a plurality of keywords, and for each keyword:
  - generating a query based on the keyword;
  - receiving a set of web documents that a search engine determines to be responsive to the query;
  - identifying one or more correlated entities from the set of web documents, each of the correlated entities being one or more terms that occurs in multiple web documents in the set of web documents, the identifying including, for each correlated entity:
    - determining that multiple web documents in the set of web documents include a same one or more terms; and
    - identifying the same one or more terms as a correlated entity in response to the determination;
  - associating the one or more correlated entities with the keyword, wherein the one or more correlated entities are used with the keyword to identify content items to be presented responsive to a received request;
- subsequent to associating the correlated entities with the keywords, receiving a request for web documents from a requesting device, the request including at least one of the plurality of keywords;
- selecting correlated entities associated with the at least one of the plurality of keywords;
- identifying one or more content items that are responsive to the correlated entities associated with the at least one of the plurality of keywords; and
- providing to the requesting device web documents responsive to the request and at least one of the identified content items.

2. The computer-implemented method of claim 1, wherein identifying one or more correlated entities comprises:
- determining, for each correlated entity, an average frequency of occurrence of the correlated entity in the set of web documents in which the correlated entity occurs; and
- ranking the correlated entities based on an average frequencies of occurrence.

3. The computer-implemented method of claim 1, wherein identifying one or more correlated entities comprises:
- determining, for each correlated entity, locations of the correlated entity in each of the web documents in which the correlated entity occurs in the set of web documents; and
- ranking the correlated entities based on locations of the correlated entities in the web documents.

4. The computer-implemented method of claim 1, further comprising:
- identifying second content items determined to be responsive to the at least one of the plurality of keywords;
- identifying third content items from the one or more content items and the second content items, the third content items being content items that are identified in both the one or more content items and the second content items; and
- filtering the one or more content items and the second content items so that the third content items are presented first among the one or more content items and the second content items and with the web documents that are determined to be responsive to the request received from the requesting device.

5. The computer-implemented method of claim 1, further comprising:

receiving a selection of a first keyword from the requesting device, the first keyword being one of the plurality of keywords;

selecting correlated entities associated with the first keyword; and providing the correlated entities to the requesting device for selection by a user of the requesting device.

6. The computer-implemented method of claim 1, further comprising auctioning the correlated entities as keywords.

7. The computer-implemented method of claim 1, further comprising offering to sell the correlated entities for use during an exclusive term.

8. The computer-method of claim 1 wherein, the correlated entities comprise multi-word expressions.

9. A system, comprising:

one or more processors; and a memory system in data communication with the one or more processors and storing instructions executable by the one or more processors and that upon such execution the instructions cause the one or more processors to perform operations comprising:

selecting a plurality of keywords, and for each keyword:

generating a query based on the keyword;

receiving a set of web documents that a search engine determines to be responsive to the query;

identifying one or more correlated entities from the set of web documents, each of the correlated entities being one or more terms that occurs in multiple web documents in the set of web documents, the identifying including, for each correlated entity:

determining that multiple web documents in the set of web documents include a same one or more terms; and identifying the same one or more terms as a correlated entity in response to the determination;

associating the one or more correlated entities with the keyword, wherein the one or more correlated entities are used with the keyword to identify content items to be presented responsive to a received request;

subsequent to associating the correlated entities with the keywords, receiving a request for web documents from a requesting device, the request including at least one of the plurality of keywords;

selecting correlated entities associated with the at least one of the plurality of keywords;

identifying one or more content items that are responsive to the correlated entities associated with the at least one of the plurality of keywords; and providing to the requesting device web documents responsive to the request and at least one of the identified content items.

10. The system of claim 9, wherein the one or more processors upon executing the instructions perform operations comprising:

determining, for each correlated entity, an average frequency of occurrence of the correlated entity in the set of web documents in which the correlated entity occurs; and ranking the correlated entities based on an average frequencies of occurrence.

11. The system of claim 9, wherein the one or more processors upon executing the instructions perform operations comprising:

determining, for each correlated entity, locations of the correlated entity in each of the web documents in which the correlated entity occurs in the set of web documents; and ranking the correlated entities based on locations of the correlated entities in the web documents.

12. The system of claim 9, wherein the one or more processors upon executing the instructions perform operations comprising:

identifying second content items determined to be responsive to the at least one of the plurality of keywords;

identifying third content items from the one or more content items and the second content items, the third content items being content items that are identified in both the one or more content items and the second content items; and filtering the one or more content items and the second content items so that the third content items are presented first among the one or more content items and the second content items and with the web documents that are determined to be responsive to the request received from the requesting device.

13. The system of claim 9, wherein the one or more processors upon executing the instructions perform operations comprising:

receiving a selection of a first keyword from the requesting device, the first keyword being one of the plurality of keywords;

selecting correlated entities associated with the first keyword; and providing the correlated entities to the requesting device for selection by a user of the requesting device.

14. The system of claim 9, wherein the one or more processors upon executing the instructions perform operations comprising auctioning the correlated entities as keywords.

15. The system of claim 9, wherein the one or more processors upon executing the instructions perform operations comprising offering to sell the correlated entities for use during an exclusive term.

16. The system of claim 9, wherein the correlated entities comprise multi-word expressions.

17. A computer program product, encoded on a computer-readable medium, operable to cause one or more processors to perform operations comprising:

selecting a plurality of keywords, and for each keyword:

generating a query based on the keyword;

receiving a set of web documents that a search engine determines to be responsive to the query;

identifying one or more correlated entities from the set of web documents, each of the correlated entities being one or more terms that occurs in multiple web documents in the set of web documents, the identifying including, for each correlated entity:

determining that multiple web documents in the set of web documents include a same one or more terms; and identifying the same one or more terms as a correlated entity in response to the determination;

associating the one or more correlated entities with the keyword, wherein the one or more correlated entities are used with the keyword to identify content items to be presented responsive to a received request;

subsequent to associating the correlated entities with the keywords, receiving a request for web documents from a requesting device, the request including at least one of the plurality of keywords;

selecting correlated entities associated with the at least one of the plurality of keywords;

identifying one or more content items that are responsive to the correlated entities associated with the at least one of the plurality of keywords; and providing to the requesting device web documents responsive to the request and at least one of the identified content items.

18. The method of claim 1 further comprising:

determining whether a number of content items responsive to the at least one of the plurality of keywords exceeds a threshold number of content items; and wherein identifying one or more correlated entities from the set of web documents comprises:

in response to determining that the number of content items does not exceed the threshold number of content items, identifying the one or more correlated entities from the set of web documents.

* * * * *

UNITED STATES PATENT AND TRADEMARK OFFICE

CERTIFICATE OF CORRECTION

PATENT NO. : 8,171,011 B2
APPLICATION NO. : 12/686625
DATED : May 1, 2012
INVENTOR(S) : Piotr Szulczewski It is certified that error appears in the above-identified patent and that said Letters Patent is hereby corrected as shown below:

In Claim 8, Line 16, Column 9, delete "computer-method" and insert -- computer-implemented method, --, therefor.

Signed and Sealed this
Seventeenth Day of July, 2012

David J. Kappos
*Director of the United States Patent and Trademark Office*